United States Patent
Laupheimer et al.

(10) Patent No.: US 7,431,064 B2
(45) Date of Patent: Oct. 7, 2008

(54) PRESS

(75) Inventors: Ulrich Laupheimer, Schemmerhofen (DE); Kurt Lämmle, Ehlingen (DE); Egon Ogger, Altheim (DE); Werner Götz, Achstetten (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 419 days.

(21) Appl. No.: 11/352,467

(22) Filed: Feb. 10, 2006

(65) Prior Publication Data

US 2006/0179907 A1  Aug. 17, 2006

(30) Foreign Application Priority Data

Feb. 14, 2005  (DE)  ........................ 10 2005 006 783

(51) Int. Cl.
 *B32B 37/00*  (2006.01)
(52) U.S. Cl. .................... 156/358; 156/581; 53/453; 53/559
(58) Field of Classification Search ................. 156/358, 156/580, 581, 583.1; 53/77, 453, 559; 700/301, 700/302, 303
See application file for complete search history.

(56) References Cited

U.S. PATENT DOCUMENTS

| | | | |
|---|---|---|---|
| 3,509,686 A | 5/1970 | Bergstrom | |
| 3,817,801 A | 6/1974 | Widmer | |
| 4,026,226 A | 5/1977 | Hahn | ........................ 113/1 F |
| 4,978,056 A | 12/1990 | Ball | ........................ 229/123.2 |
| 5,307,692 A | 5/1994 | Kaplan | |
| 7,331,281 B2 * | 2/2008 | Laupheimer | ................ 100/209 |
| 2002/0023417 A1 * | 2/2002 | Becker | ........................ 53/559 |
| 2004/0187443 A1 * | 9/2004 | Michel | ........................ 53/453 |

FOREIGN PATENT DOCUMENTS

| CN | 1408634 | 4/2003 |
|---|---|---|
| DE | 43 26 233 | 2/1995 |

* cited by examiner

*Primary Examiner*—James Sells
(74) *Attorney, Agent, or Firm*—Andrew Wilford

(57) ABSTRACT

A press for laminating together a pair of foils has an upper die and a movable lower die, the foil extending. An actuating plate is movable toward and array from the stationary die. A spring is provided between the actuating plate and the movable die. A drive displaces the actuating plate and the movable die carried by the spring thereon toward and away from the stationary die for compressing the foils between the dies when the dies are spaced apart by a predetermined distance equal substantially to a thickness of the foils. A sensor detects movement of the movable die toward the actuating plate with compression of the spring on movement of the actuating plate toward the stationary die. When the sensor detects movement of the movable die when the dies are spaced apart by a distance greater than the predetermined distance the actuating plate is arrested.

7 Claims, 1 Drawing Sheet

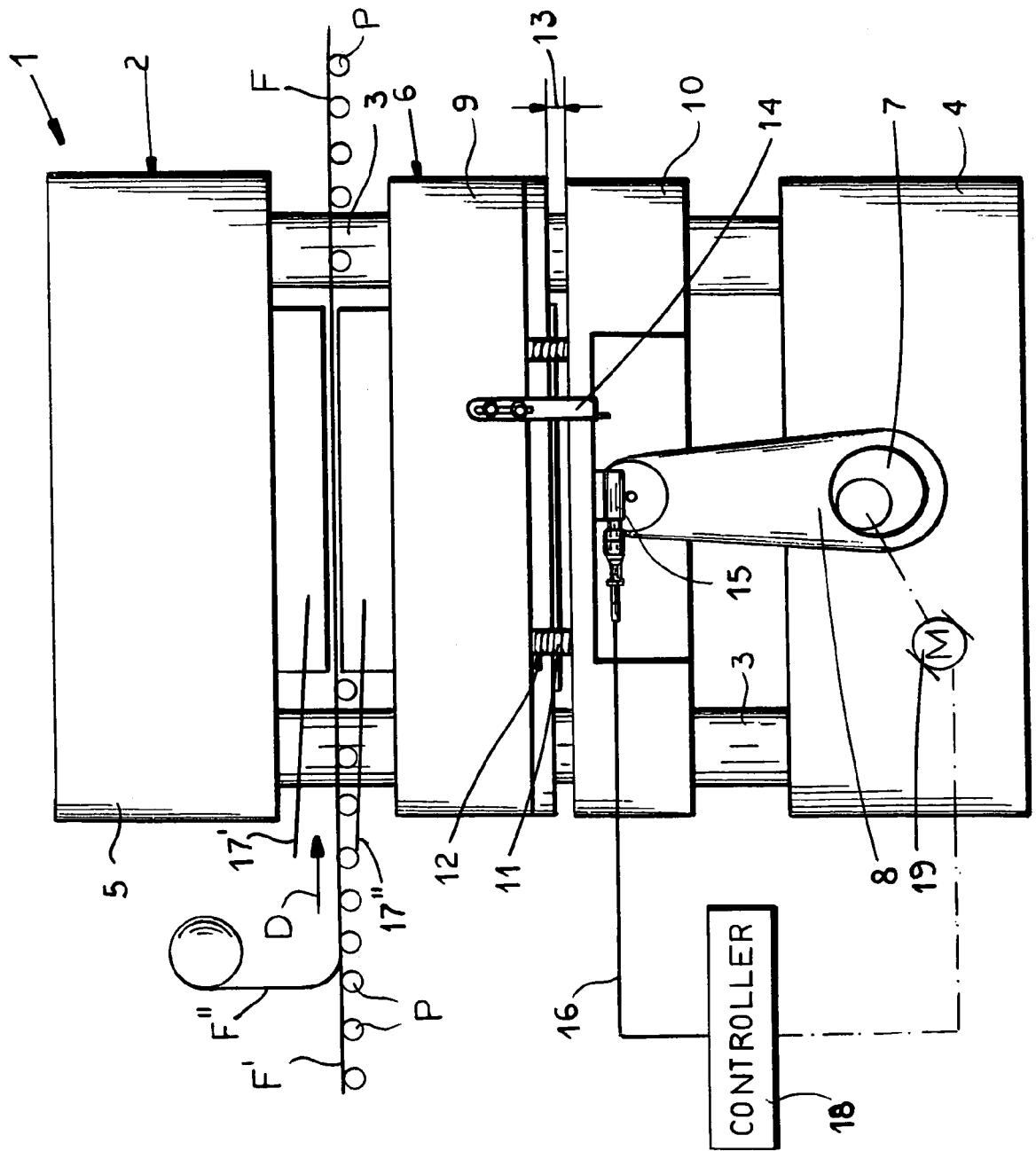

PRESS

FIELD OF THE INVENTION

The present invention relates to a press. More particularly this invention concerns a press used for forming blister packages.

BACKGROUND OF THE INVENTION

Presses are known for laminating together foils in packaging operations from U.S. Pat. Nos. 3,509,686, 3,817,801, and 5,307,692 as well as from U.S. Patent publications 2002/0023417 and 2004/0187443. As a rule such presses have a pair of vertically spaced dies, the lower one of which can be shifted vertically. A normally flat upper foil and a lower foil formed with an array of upwardly open and downwardly projecting pockets filled with items to be contained are passed through the press. The lower platen has an array of upwardly open recesses that fit loosely around the pockets of the lower foil. Both the platens are heated so that when they are pressed together, with the upper platen bearing downward on the upper face of the upper foil and the lower platen bearing upward on the lower face of the lower foil between the pockets, the confronting faces of the two foils are bonded together.

In order to squeeze out air bubbles and bring the platens together gently it is known also from German patent document 43,26,233 of M. Lübbers and R. Rütteroth to provide springs between the platens and their actuating plates. This arrangement puts an upper limit on the force the platens can exert so as not to damage fragile thermoplastic foils.

A problem with these arrangements is that occasionally the items in the pockets of the lower foil come out of these pockets. If the item is a soft candy or easily crushed pill, this merely means that the workpiece will be spoiled and a batch of rejects will be produced, as the laminating operation will be done. When, however, the item is something hard, for instance a metal bolt, the platens can be damaged and the workpiece can be pierced, requiring a time-consuming repair and cleanup operation.

OBJECTS OF THE INVENTION

It is therefore an object of the present invention to provide an improved press.

Another object is the provision of such an improved press that overcomes the above-given disadvantages, in particular that prevents any substantial damage to the workpiece or the press if items inside the pockets find their way onto the top face of the lower foil.

SUMMARY OF THE INVENTION

A press for laminating together a pair of foils has according to the invention a generally stationary die and a die movable toward and away from the stationary die. The foils extend between the dies, and an actuating plate is movable toward and away from the stationary die. A spring is provided between the actuating plate and the movable die. A drive displaces the actuating plate and the movable die carried by the spring thereon toward and away from the stationary die for compressing the foils between the dies when the dies are spaced apart by a predetermined distance equal substantially to a thickness of the foils. A sensor detects movement of the movable die toward the actuating plate with compression of the spring on movement of the actuating plate toward the stationary die. According to the invention a controller connected to the drive and to the sensor arrests displacement of the actuating plate toward the stationary die when the sensor detects movement of the movable die toward the actuating plate when the dies are spaced apart by a distance greater than the predetermined distance, and normally then moves the dies apart.

Thus with this system before any substantial damage to the workpiece or dies can occur in case something gets between the foils, the press is stopped and normally also opened. The workpiece can be stepped downstream and the laminating operation can continue. The unsealed portion can be stripped and its product easily recovered.

The invention has the further advantage that the platens are moved very gently together, as the springs can have an initial very low resistance to compression, so that bubbles are pressed out from between the foils and the foils are gently preheated before being compressed forcibly together.

According to the invention this spring is a compression spring, or even an array of compression springs. The press further has a stationary upper member carrying the stationary die, a lower member underneath the upper member and carrying the drive, and vertical tie rods vertically interconnecting the upper and lower members. The actuating plate is a lower plate shiftable along the rods and connected to the drive. An upper plate shiftable along the rods above the upper plate carries the movable die. The spring is vertically braced between the upper plate and lower plate.

The sensor system includes a sensor arm projecting downward from the upper plate and a position sensor on the lower plate capable of detecting a position of the sensor arm. This arm is vertically adjustable on the upper plate to compensate for foils of different thicknesses. Such a system is extremely simple, yet accurately responds when something gets between the foils.

The drive according to the invention has a lower rotatable eccentric, a drive motor connected to the eccentric and to the controller, and a crank connected between the eccentric and the lower plate.

BRIEF DESCRIPTION OF THE DRAWING

The above and other objects, features, and advantages will become more readily apparent from the following description, reference being made to the accompanying drawing whose sole FIGURE is a partly schematic side view of the apparatus according to the invention.

SPECIFIC DESCRIPTION

As seen in FIG. 1 a press 1 basically comprises a massive frame 2 comprised of a stationary lower member 4, a stationary upper member 5 spaced above the lower member 4, and a plurality of parallel and vertically extending tie rods interconnecting and extending between the members 4 and 5. A middle member 6 riding on the tie rods 3 is comprised of an upper plate 9 and a lower plate 10 interconnected by a spring assembly 11 in turn comprised of a plurality of coil springs 12. The springs 12 normally hold the plates 9 and 10 apart at a vertical spacing 13.

A drive motor 19 can rotate an eccentric 7 about a horizontal axis at the lower member 4. A crank 8 fitted to this eccentric 7 has an upper end centrally pivoted on the lower plate 10 so that, as the eccentric 7 rotates, the plate 10 and with it the plate 9 are reciprocated vertically on the rods 3. The stationary upper member 5 carries an upper die 17' with a basically flat and planar lower face and the upper plate 9 of the middle member 6 carries another die 17" with a planar and flat upper face formed with an array of recesses.

A foil workpiece F passing through the press 1 is comprised of a planar upper foil F', a lower foil F" formed with an array of pockets P complementary to the recesses of the die 17". Each of the pockets P of the lower foil F" is filled with some commodity, typically a bulk item like a foodstuff or medicament. The dies 17' and 17" are normally heated and the foils F' and F" of the workpiece F are typically at least partially thermoplastic so the two dies 17' and 17" can weld together its two foils between the pockets.

Further in accordance with this invention the upper plate 9 carries a downwardly projecting and vertically adjustable sensor arm 14 and the lower plate 10 carries a position sensor 15 connected by a line 16 to a control system 18 that also operates the motor 19. The purpose of the sensor arm 14 and sensor 15 is to determine when the two plates 9 and 10 move relative to each other, which action takes place when the springs 12 are compressed. The lower end of the arm 14 can carry a mirror and the sensor 15 can be a source emitting a light beam and a photocell, so that when the light beam is reflected back the sensor 15 generates an output signal.

The springs 12 are quite stiff, so that they will only be compressed, thereby reducing the spacing 13 and causing the sensor 16 to emit an output, when upward displacement of the upper plate 9 is resisted by a substantial force. Under normal circumstances this will only occur when the two dies 17' and 17" are gripping the workpiece F and their confronting faces are spaced apart substantially only by the thickness of this workpiece F. When, however, some of the material, e.g. a pill, from one of the pockets P, has come out and is lying on the lower foil F' between the pockets P, the springs 12 will be compressed prematurely, that is before the faces of the dies 17' and 17" are spaced apart by the combined thicknesses of the foils F' and F".

According to the invention the controller 18, which operates the drive motor 19 for the crank 18, in effect monitors the position of the lower plate 10, which position is a function of the angular position of the eccentric 7 controlled by the motor 19. When the sensor 15 reports relative shifting together of the two plates 9 and 10 prior to when the dies 17' and 17" are closed on the workpiece F, the controller 18 immediately stops the motor 19 and reverses the drive 19 to open the press 1 and allow the damaged part of the workpiece F to be moved out of the press 1.

This action prevents damage to the workpiece F and to the platens 17' and 17". Furthermore it takes place before the foils F' and F" are laminated together so that it is possible to strip them apart downstream and recover the often valuable product in the pockets P.

We claim:

1. A press for laminating together a pair of foils, the press comprising:
   a generally stationary die;
   a die movable toward and away from the stationary die, the foils extending between the dies;
   an actuating plate movable toward and away from the stationary die;
   a spring between the actuating plate and the movable die;
   drive means for displacing the actuating plate and the movable die carried by the spring thereon toward and away from the stationary die for compressing the foils between the dies when the dies are spaced apart by a predetermined distance equal substantially to a thickness of the foils;
   sensor means for detecting movement of the movable die toward the actuating plate with compression of the spring on movement of the actuating plate toward the stationary die; and
   control means connected to the drive means and to the sensor means for arresting displacement of the actuating plate toward the stationary die when the sensor means detects movement of the movable die toward the actuating plate when the dies are spaced apart by a distance greater than the predetermined distance.

2. The laminating press defined in claim 1 wherein the spring is a compression spring.

3. The laminating press defined in claim 1 wherein the press further comprises:
   a stationary upper member carrying the stationary die;
   a lower member underneath the upper member and carrying the drive means;
   vertical tie rods vertically interconnecting the upper and lower members, the actuating plate being a lower plate shiftable along the rods and connected to the drive means;
   an upper plate shiftable along the rods above the upper plate and carrying the movable die, the spring being vertically braced between the upper plate and lower plate.

4. The laminating press defined in claim 2 wherein the sensor means includes:
   a sensor arm projecting downward from the upper plate, and
   a position sensor on the lower plate capable of detecting a position of the sensor arm.

5. The laminating press defined in claim 4 wherein the arm is vertically adjustable on the upper plate.

6. The laminating press defined in claim 3 wherein the drive includes
   a lower rotatable eccentric;
   a drive motor connected to the eccentric and to the control means; and
   a crank connected between the eccentric and the lower plate.

7. The laminating press defined in claim 1 wherein the control means, after arresting the displacement of the actuating plate, reverses displacement of the actuating plate and moves the dies apart.

* * * * *